June 16, 1964  M. F. PETERS  3,137,317
EXPANSION TANK

Filed June 3, 1963  2 Sheets-Sheet 1

INVENTOR.
MELVILLE F. PETERS
BY Albert F. Kronman
ATTORNEY

June 16, 1964  M. F. PETERS  3,137,317
EXPANSION TANK

Filed June 3, 1963  2 Sheets-Sheet 2

INVENTOR.
MELVILLE F. PETERS
BY Albert F. Kronman
ATTORNEY

United States Patent Office 3,137,317
Patented June 16, 1964

3,137,317
EXPANSION TANK
Melville F. Peters, 29 N. Ridge Road, Livingston, N.J.
Filed June 3, 1963, Ser. No. 285,012
9 Claims. (Cl. 138—30)

This invention relates to fluid tight seals and particularly to the fluid tight attachment of an elastomeric material to a rigid structure to confine fluids under pressure.

Previously known devices such as expansion tanks and the like which rely upon a rigid outer shell or housing to clamp a portion of a diaphragm, bag or bellows formed of an elastomer material to a supporting ring as a means of dividing the housing into two or more fluid tight chambers, have failed after a relatively short period of time. These failures may be divided into two kinds.

The first kind of failure takes place when fluid leaks between the two chambers during the period the tank is operated at the temperature at which the unit was assembled. This leakage takes place because the housing does not exert sufficient pressure on the portion of the elastomer clamped between the housing and the supporting ring to form a fluid tight seal. This leakage generally stops after the elastomer has swollen. This swelling takes place by either bringing the elastomer in contact with fluids which it can absorb, or by raising its temperature, or both. The leakage which takes place during the swelling period cannot be tolerated in a commercially acceptable structure.

The second kind of failure takes place when some of the elastomer clamped between the housing and the ring is extended. This occurs when the temperature of the tank is raised. Where the elastomer absorbs fluids in structures where the housing presses upon the elastomer hard enough to form a fluid tight seal at the assembling temperature of the tank, extrusion will also occur. The extruded elastomer is stressed between the sealed edges and the flexible portion of the diaphragm or bag. This is the area or region of the diaphragm which is subjected to the greatest tension and bending forces and consequently it is the area which limits the life of the elastomer which forms the fluid tight seal between the two chambers in the tank.

All elastomers swell with an increase in temperature by the absorption of fluids. Silicon resin, for example is known to increase in volume by 10% when heated through a temperature range of 100° C. Many other types of elastomers undergo a volume expansion of 100% or more when submerged in hydrocarbons such as carbon tetrachloride, benzine and the like. When submerged in boiling water elastomers exhibit from 5% to 25% increase in volume. The time in which the major portion of the swelling takes place may vary from a matter of minutes, in the case of submersion of the elastomer in hydrocarbons to approximately 400 hours for boiling water.

Since the effective swelling of the bag does not take place until either the temperature of the bag has been raised above the temperature at which the unit was assembled or the elastomer has absorbed fluids, it is necessary to assure there is a tight seal when the unit is filled with cold water to bond the peripheral portion of the bag to the anchoring members by any approved method such as cementing, vulcanizing or bonding. Inspection of bags relying upon mechanical forces to make a seal, have shown that liquid has leaked between the chambers separated by the elastomer bag or diaphragm. This leakage can be prevented by bonding the edges of the elastomer to the metal support, and welding the supporting rigid assembly to a second rigid support which may be the wall of the housing.

Accordingly, it is an object of the present invention to increase the useful life of bellows, diaphragms and bags of elastomeric material which are clamped between rigid structures in the presence of fluids.

Another object of the present invention is to provide a clamping structure for elastomeric material which will receive the increased volume of the elastomer without causing it to extrude.

A further object of the present invention is to utilize the tendency of elastomeric material to increase in volume when exposed to fluids or heat to improve the fluid tight seal between a rigid and an elastomeric member without extruding elastomer.

A feature of the present invention is its use of voids within the rigid clamping structure to receive the expanding elastomer.

A further feature of the present invention is its use of voids or openings in the elastomeric material which will be closed by the expanding elastomer without changing its exterior dimensions.

Another feature of the present invention is to form a hermetic seal between two chambers in a housing by bonding or cementing an elastomer bag or diaphragm to a supporting structure and welding the supporting structure to the housing.

Another feature of the present invention is its use of holes or openings in the rigid clamping structure whereby fluid is brought into contact with the elastomer to accelerate its change in volume by absorption of the fluid and thereby improve the seal.

Another feature of the present invention is its use of specially shaped elastomeric beads, responsive to the fluid pressure to improve the seal.

Another feature of the present invention is to cement or bond a portion of the bag to the ring-like members of the metal element supporting the bag.

The invention consists of the construction, combination and arrangement of parts, as herein illustrated, described and claimed.

In the accompanying drawings, forming a part hereof are illustrated several forms of embodiment of the invention, in which drawings similar reference characters designate corresponding parts, and in which.

Figure 1:
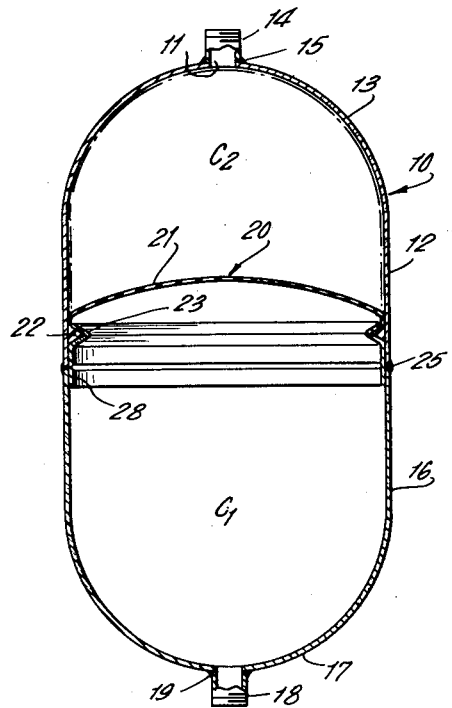
FIGURE 1 is a view in vertical section of an expansion tank showing the manner in which a hermetical seal is formed between an elastomer bag or diaphragm and the inner wall of a shell in accordance with the present invention.
Figure 2:
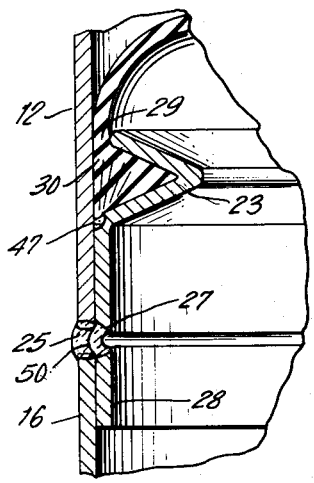
FIGURE 2 is a fragmentary view in vertical section somewhat enlarged, made in accordance with one form of the present invention.

Referring to the drawings and particularly to FIGURES 1, and 2, there is shown an expansion tank 10. The assembly consists of a rigid first cylindrical shell 12 closed at one end by a dome 13. An opening 11, in the dome 13 is in communication with a threaded fitting 14. The fitting 14 is attached to the dome by welding as illustrated at 15. A second rigid cylindrical portion 16 having a dome-like closure 17 at one end thereof completes the housing of the expansion chamber 10. The second cylindrical portion is also provided with a threaded fitting 18 secured to the lower dome 17 at 19.

A bag or diaphragm 20 made of some elastomeric material is peripherally secured to the interior of the shell 12 and divides the housing into two compartments C1 and C2. A thickened portion 22 is formed in the elastomer of the diaphragm 20 around the edge thereof to secure the thin body 21 to the rigid housing structure. The thickened portion, hereinafter referred to as the bead 22 is locked within a ring-like member 23 having a somewhat V-shaped cross-section. A cylindrical skirt 28 depends from the ring-like member 23 and supports the portions of the first and second cylindrical portions 12 and 16.

Leakage between bead 22 and the ring-like member 23 along their contacting surfaces is prevented by bonding or cementing the ring and bead surfaces together. Alternately, the bead 22 may be made to fit tightly between the cylindrical shell 12 of the housing 10 and the ring 23. A high order of sealing can be obtained by cementing or bonding the contacting surfaces of the bead, ring and shell 12. A snug fit within the enclosing ring and shell surfaces is possible by providing a groove 47 in skirt 28 which serves as an expansion cavity and allows head 22 to expand into groove 47 with increases in temperature or absorption of fluids and limits the quantity of elastomer which extrudes into opening 29.

The ring 23 and skirt 28 positions the diaphragm 20 in the tank. The skirt 28 is outwardly rolled to provide an annular rib 50 therein which serves as a stop for positioning the cylindrical portions 12, 16, and permits the weld indicated at 25 to be made with relatively thin walled cylindrical elements having large diameters. This weld prevents the fluids which leak over the contacting surfaces between cylindrical portions 12 and bead 22 from passing between chambers $C_1$ and $C_2$.

When the chamber $C_1$ is filled with fluid the elastomeric material of the diaphragm 20 will eventually expand or swell. In the prior art structures a bead was clamped within a confined space with the bead completely filling the space in which it was held. As a result, upon expansion, the elastomer of the bead 22 was extruded from the clamp through the opening between the clamp and the cylindrical portion of the expansion chamber. This extruded area constituted a ring of weakened elastomeric material along which the diaphragm failed.

In FIGURES 2–7, there are shown several bead and sealing ring structures by means of which elastomer extrusion is prevented while providing a fluid tight attachment of the diaphragm or bag 20 at all times. These structures substantially extend the useful life of the expansion tank even when used with fluid under pressure and at elevated temperatures.

Figure 3:
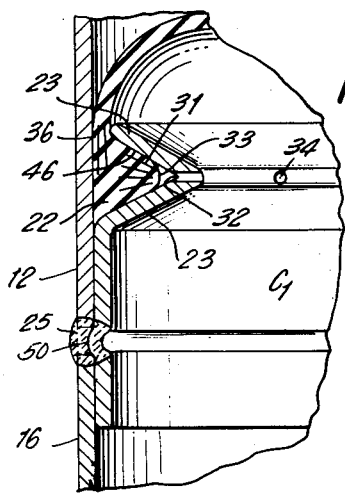
FIGURE 3 is a view similar to FIGURE 2 of a fluid tight seal showing a further embodiment of the present invention.

Referring to FIGURE 3, it will be seen that the bead 22 which is wedge-shaped in cross-section has been truncated at 33 to leave a space 32 between the apex of the bead and the inner portion of the V-shaped ring 23. The elastomer of the bead 22 can expand into this space 32 as indicated by the converging lines 31 reducing the tendency of the material to extrude in the direction shown by lines 36. A suitable cement 46 is placed between the thickened portion 22 of bag 20 and the ring-like member 23 to hold the surfaces together.

A plurality of spaced openings 34 are provided in the ring 24 whereby fluid in the chamber $C_1$ can enter the space 32. The fluid in the space 32 serves a twofold purpose in that it accelerates the expansion of the elastomer and, since it is under pressure compresses the bead 22 forcing it into fluid tight contact with the ring 24 and inside surface of the rigid cylindrical member 12. The expanded elastomer further improves the mechanical strength of the fluid tight seal without causing extrusion.

Figure 4:
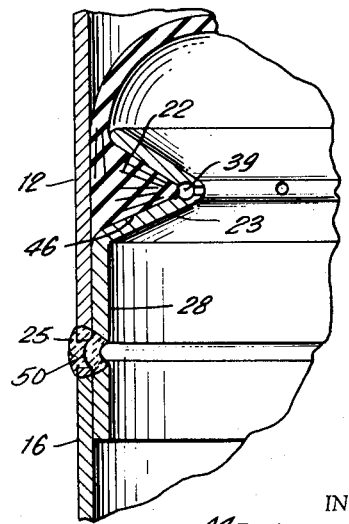
FIGURE 4 is a view similar to FIGURE 2 of a fluid tight seal, showing another embodiment of the present invention.

The embodiment shown in FIGURE 4 differs from that shown in FIGURE 3 in that the ring-like member 23 is formed with an annular groove 39 of substantially circular cross-sectional shape at the apex of the V. The groove 39 provides a chamber or space into which the elastomer bead 22 may expand without extrusion between the ring 23 and the cylindrical member 12.

Figure 5:
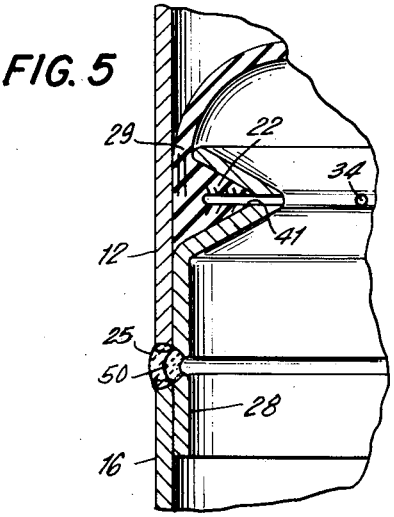
FIGURE 5 is a view similar to FIGURE 2 showing still another embodiment of the present invention.

In FIGURE 5 the bead 22 is formed with a continuous groove or slit 41 extending inwardly from the apex of the said bead. The groove 41 provides a void or chamber within the bead so that as the bead expands the void will be collapsed without changing the outer shape of the bead or causing extrusion of the elastomer. The holes 34 in this embodiment also admit fluid under pressure to the exterior of the bead slit or groove 41 for the purposes set forth in the description of FIGURE 3.

Figure 6:
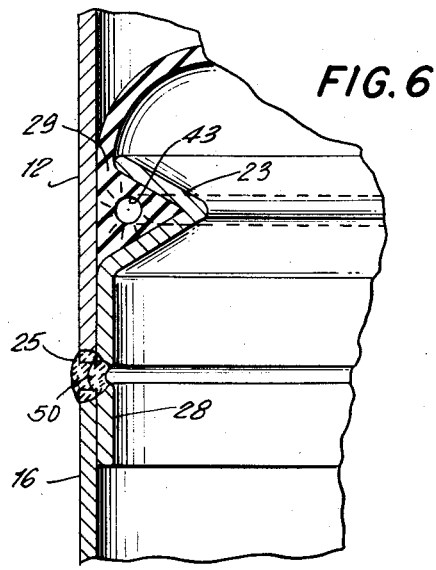
FIGURE 6 is a view similar to FIGURE 2 showing a further embodiment of the present invention.

A void or continuous chamber is provided in the embodiment of FIGURE 6 by incorporating a ring-like channel 43 within the structure of the bead 22. As the elastomer expands the channel 43 will become smaller without changing the outside wedge-shape of the bead or forcing it out of the ring 23. It is within the purview of the present invention to employ a plurality of holes in lieu of the channel 43 or incorporate a core of porous material within the bead 22 to accommodate the expansion of the elastomer in the bead.

Since the channel 43 or holes (not shown) contain gases or vapors which may be at a pressure of one atmosphere or several atmospheres, an increase in temperature or a swelling of the elastomer will increase the pressure in the channel or holes. If a liquid is used in the chamber $C_1$ with a selected boiling point, the pressure in the channel 43 or holes can be raised to any predetermined value within the operating temperature of the seal. Placing the channel or holes within the bead 22 makes it possible to bond or cement the bead to the ring 23 while at the same time permitting expansion of the elastomer into the channel or holes.

Figure 7:
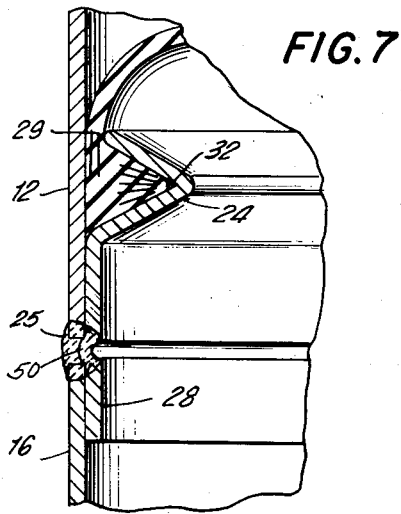
FIGURE 7 is a view similar to FIGURE 2 showing another embodiment of the present invention.

In certain applications the highly simplified structure shown in FIGURE 7 may be employed. In this embodiment elastomer expansion without extrusion is provided for by the space 32 between the end of the bead 22 and the interior of the V-shaped opening in the ring 24.

Figure 8:
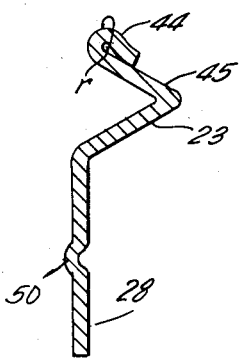
FIGURE 8 is a fragmentary cross-sectional view of another form of retaining ring according to the present invention.

Since the elastomer bag 20 may become completely inverted, the upper edge 44 of ring 23 shown in FIGURE 8, may be turned over, to form the radius $r$. The radius $r$ may have any value, but it should be great enough to prevent a sharp bend of the elastomer bag around the edge 44 when the pressure in chamber $C_2$ is much greater than the pressure in $C_1$.

When the bond is made between the thickened portion 22 of the bag 20 and the retaining ring 23 at temperatures equal to the operating temperature of the expansion chamber, the thickened portion 22 of the bag 20 may fit snugly into the ring 23, since the forces developed between the bonded surfaces of 22 and 23, when the chamber cools to room temperature, will not be great enough to destroy the seal between the surfaces. This structure is shown in FIGURE 7.

Having thus fully described the invention, what is claimed as new and desired to be secured by Letters Patent of the United States, is:

1. An expansion tank comprising a first cylindrical housing substantially closed at one end, a second cylindrical housing substantially closed at one end, said housing members being disposed with their open ends in abutting relationship, a retaining ring within the housing adjacent the abutting portions thereof and secured to the housing to form a fluid tight container, an inwardly extending portion on the retaining ring having a somewhat V-shaped cross section, an elastomeric member transversely disposed within the housing to divide the housing into a first and second chamber, a thickened peripheral bead on the elastomeric member received within the V-shaped portion of the retaining ring, said thickened bead having an initial cross-sectional area smaller than the cross-sectional area of the V-shaped portion whereby swelling of the elastomer bead will not cause it to extrude from within the ring.

2. An expansion tank comprising a first cylindrical housing substantially closed at one end, a second cylindrical housing substantially closed at one end, said housing members being disposed with their open ends in abutting relationship, a retaining ring within the housing adjacent the abutting portions thereof and secured to the housing to form a fluid tight container, an inwardly extending portion on the retaining ring having a somewhat V-shaped cross-section, an elastomeric member transversely disposed within the housing to divide the housing into a first and second chamber, a thickened peripheral bead on the elastomeric member received within the V-shaped portion of the retaining ring, and bonded to the inner surfaces of the said ring, said thickened bead having an initial cross-sectional area smaller than the cross-sectional area of the V-shaped portion whereby swelling of the elastomer bead will not cause it to extrude from within the ring.

3. An expansion tank according to claim 2 in which the bead is of a truncated V-shape.

4. An expansion tank according to claim 2 in which the V-shaped portion of the ring is provided with a plurality of spaced openings to admit fluid into the space between the bead and the interior of the ring.

5. An expansion tank according to claim 2 in which the V-shaped portion of the ring is provided with a plurality of spaced openings to admit fluid into the space between the bead and the interior of the ring, and the V-shaped portion of the ring is formed with an annular recess in the apex thereof.

6. An expansion tank according to claim 2 in which the V-shaped portion of the ring is provided with a plurality of spaced openings to admit fluid into the space between the bead and the interior of the ring, and the bead is formed with an annular recess therein in communication with the ring openings.

7. An expansion tank according to claim 1 in which the bead is provided with at least one void therein into which the elastomer may expand.

8. An expansion tank according to claim 1 in which the ring is formed with a depending skirt portion in contact with the housing inner wall and the V-shaped portion is doubled back upon itself at its outer periphery to form a radius to support the elastomer.

9. An expansion tank according to claim 1 in which the ring is formed with a depending skirt portion in contact with the housing inner wall, an outwardly disposed annular rib on the skirt portion and the V-shaped portion is doubled back upon itself at its outer periphery to form a radius to support the elastomer.

References Cited in the file of this patent

UNITED STATES PATENTS 1,969,795    Hewitt _____ Aug. 14, 1934